(12) United States Patent
Kleckner et al.

(10) Patent No.: US 11,570,974 B2
(45) Date of Patent: Feb. 7, 2023

(54) ADJUSTABLE HAND NET DEVICE AND HANDLE

(71) Applicant: Plano Molding Company, LLC, Plano, IL (US)

(72) Inventors: Ryan J. Kleckner, Grafton, WI (US); Timothy S. Makos, West Bend, WI (US); Kaitlyn Benoit, New York, NY (US); Meegan Daigler, Brooklyn, NY (US); Neil Kwiatkowski, Queens, NY (US); Ronald Ondrey, Plano, IL (US); Charlie Paradise, Brooklyn, NY (US)

(73) Assignee: Plano Molding Company, Plano, IL (US)

( * ) Notice: Subject to any disclaimer, the term of this patent is extended or adjusted under 35 U.S.C. 154(b) by 525 days.

(21) Appl. No.: 16/397,208

(22) Filed: Apr. 29, 2019

(65) Prior Publication Data

US 2019/0335731 A1    Nov. 7, 2019

Related U.S. Application Data

(60) Provisional application No. 62/665,960, filed on May 2, 2018.

(51) Int. Cl.
*A01K 77/00* (2006.01)
*A01K 75/00* (2006.01)

(52) U.S. Cl.
CPC .............. *A01K 77/00* (2013.01); *A01K 75/00* (2013.01)

(58) Field of Classification Search
CPC ..................................................... A01K 77/00

USPC ........................................................ 43/11, 12
See application file for complete search history.

(56) References Cited

U.S. PATENT DOCUMENTS

| | | | | |
|---|---|---|---|---|
| 1,416,543 A | * | 5/1922 | Bartos | A01K 77/00 43/12 |
| 1,450,322 A | * | 4/1923 | McElhany | A01K 77/00 43/12 |
| 1,857,826 A | * | 5/1932 | Slamen | A01K 77/00 43/12 |
| 1,921,323 A | * | 8/1933 | Purdon | A01K 77/00 43/12 |
| 2,066,439 A | * | 1/1937 | Wine | A01K 77/00 43/12 |

(Continued)

FOREIGN PATENT DOCUMENTS

| | | | | |
|---|---|---|---|---|
| CA | 2762699 C | * | 7/2017 | ............. A01K 77/00 |
| CH | 255639 A | * | 7/1948 | ............. A01K 77/00 |

(Continued)

OTHER PUBLICATIONS

International Search Report issued in PCT/US2019/029627, dated Aug. 7, 2019.*

(Continued)

*Primary Examiner* — Darren W Ark
(74) *Attorney, Agent, or Firm* — Husch Blackwell LLP (57) ABSTRACT

A hand net device that includes a basket that receives and holds an object, a yoke that has a yoke body coupled to the basket, and a handle assembly having a proximal end and a distal end, the proximal end being adjustably coupled to the yoke body, wherein the yoke body guides the handle assembly between a stow position and an extended position.

12 Claims, 13 Drawing Sheets

(56) References Cited

U.S. PATENT DOCUMENTS

| | | | | |
|---|---|---|---|---|
| 2,160,584 | A | * | 5/1939 | Garrett ............... A01K 77/00 43/12 |
| 2,595,597 | A | * | 5/1952 | Morseth ............... A01K 77/00 285/302 |
| 2,653,403 | A | * | 9/1953 | Oslund ............... A01K 77/00 43/11 |
| 2,688,815 | A | * | 9/1954 | Phillips ............... A01K 77/00 43/12 |
| 2,724,920 | A | * | 11/1955 | Boehm ............... A01K 77/00 43/12 |
| 2,725,658 | A | * | 12/1955 | Wiederhold ............... A01K 77/00 43/12 |
| 2,800,737 | A | * | 7/1957 | Crossan ............... A01K 77/00 43/12 |
| 2,834,138 | A | * | 5/1958 | Pedersen ............... A01K 77/00 43/11 |
| 2,984,038 | A | * | 5/1961 | Chapralis ............... A01K 77/00 43/12 |
| 4,050,177 | A | | 9/1977 | Gerritsen |
| 4,138,790 | A | * | 2/1979 | Schmucker ............... A01K 77/00 43/12 |
| 4,392,570 | A | * | 7/1983 | Willinger ............... A01K 77/00 206/231 |
| 4,401,036 | A | * | 8/1983 | Russo ............... A47B 23/046 108/150 |
| 4,601,246 | A | * | 7/1986 | Damico ............... A47B 9/083 108/146 |
| 4,619,065 | A | * | 10/1986 | Jones ............... A01K 97/24 43/11 |
| 4,822,087 | A | * | 4/1989 | DeCarlo ............... A01K 77/00 16/426 |
| 4,845,876 | A | * | 7/1989 | Dodson ............... A01K 97/14 43/5 |
| 4,870,773 | A | * | 10/1989 | Schmucker ............... A01K 77/00 43/12 |
| 5,276,995 | A | * | 1/1994 | Johnson ............... A01K 77/00 43/11 |
| 5,471,778 | A | * | 12/1995 | Marfori ............... A01K 77/00 43/12 |
| 5,533,293 | A | * | 7/1996 | Boehm ............... A01K 77/00 43/12 |
| 5,568,697 | A | * | 10/1996 | Schwartz ............... A01K 77/00 43/12 |
| 6,408,560 | B1 | * | 6/2002 | Bloom ............... A01K 77/00 403/109.3 |
| 6,454,233 | B1 | * | 9/2002 | Adams ............... A01K 77/00 248/291.1 |
| 7,124,533 | B2 | * | 10/2006 | Kleckner ............... A01K 77/00 43/11 |
| 8,490,318 | B2 | * | 7/2013 | Smith ............... A01K 77/00 43/12 |
| 8,516,737 | B2 | * | 8/2013 | Hume ............... A01K 77/00 43/11 |
| 9,801,436 | B2 | * | 10/2017 | Blood ............... A01K 77/00 |
| 10,334,831 | B2 | * | 7/2019 | Kudner ............... A01K 77/00 |
| 10,717,183 | B1 | * | 7/2020 | LaHood ............... B25G 1/04 |
| 2004/0040196 | A1 | * | 3/2004 | Schwartz ............... A01K 77/00 43/11 |
| 2004/0064996 | A1 | * | 4/2004 | Armenti ............... A01K 77/00 43/7 |
| 2004/0134115 | A1 | * | 7/2004 | Wyman ............... A01K 91/02 43/19 |
| 2004/0217246 | A1 | * | 11/2004 | Adams ............... A01K 77/00 248/291.1 |
| 2005/0024872 | A1 | * | 2/2005 | Love ............... A01K 77/00 362/253 |
| 2005/0035159 | A1 | * | 2/2005 | Hunt ............... A47G 25/624 223/94 |
| 2005/0091905 | A1 | * | 5/2005 | Larson ............... A01K 75/02 43/17.5 |
| 2006/0026890 | A1 | * | 2/2006 | Kleckner ............... A01K 77/00 43/12 |
| 2008/0156715 | A1 | * | 7/2008 | Hetzner ............... A01K 77/00 210/238 |
| 2009/0100739 | A1 | * | 4/2009 | Resch ............... A01K 77/00 43/12 |
| 2012/0036758 | A1 | * | 2/2012 | Steffens ............... A01K 77/00 43/12 |
| 2012/0091174 | A1 | * | 4/2012 | Breeze ............... A01K 77/00 224/222 |
| 2014/0157650 | A1 | * | 6/2014 | Blood ............... A01K 77/00 43/11 |
| 2015/0113852 | A1 | * | 4/2015 | Kudner ............... A01K 77/00 43/11 |
| 2016/0262506 | A1 | * | 9/2016 | Sacks ............... A45B 1/04 |
| 2018/0356278 | A1 | * | 12/2018 | Lebedev ............... A01K 93/00 |
| 2019/0335732 | A1 | * | 11/2019 | Daigler ............... A01K 75/00 |
| 2019/0335736 | A1 | * | 11/2019 | Makos ............... B25G 1/06 |
| 2020/0053995 | A1 | * | 2/2020 | Andrews ............... A01K 77/00 |
| 2020/0163317 | A1 | * | 5/2020 | Xu ............... A01K 77/00 |
| 2020/0359611 | A1 | * | 11/2020 | Xu ............... A01K 77/00 |
| 2021/0007337 | A1 | * | 1/2021 | He ............... A01K 77/00 |
| 2022/0007801 | A1 | * | 1/2022 | Roberts ............... A45B 25/02 |

FOREIGN PATENT DOCUMENTS

| | | | | |
|---|---|---|---|---|
| DE | 9417936 U1 | * | 1/1995 | ............ A01K 77/00 |
| FR | 54800 E | * | 8/1950 | ............ A01K 77/00 |
| FR | 1357103 A | * | 4/1964 | ............ A01K 77/00 |
| JP | 2021000011 A | * | 1/2021 | |
| KR | 20130121441 A | * | 11/2013 | |
| KR | 20130131188 A | * | 12/2013 | |
| WO | WO-2015065932 A2 | * | 5/2015 | ............ A01K 77/00 |

OTHER PUBLICATIONS

Translation of KR 10-2013-0131188A (Year: 2013).*
International Preliminary Report on Patentability issued in PCT/US2019/029627, dated Nov. 3, 2020.

* cited by examiner

FIG. 16B  FIG. 16C

ADJUSTABLE HAND NET DEVICE AND HANDLE

CROSS REFERENCE TO PRIOR APPLICATION

This application claims priority to and the benefit thereof from U.S. Provisional Patent Application No. 62/665,960, filed May 2, 2018, titled "Adjustable Hand Net Device and Handle," the entirety of which is hereby incorporated herein by reference.

FIELD OF THE DISCLOSURE

The disclosure relates generally to a hand net device and a handle assembly, and, more particularly to an adjustable hand net device and an adjustable handle assembly.

BACKGROUND OF THE DISCLOSURE

A variety of hand nets are known, including scoop and dip nets. These typically include a net attached to a hoop, which in turn is attached to a pole or handle. The devices come in many shapes and sizes. Hand nets have many applications, including, for example, sweeping up fish near the water's surface or lifting fish out of the water that were caught using a rod and reel.

Figure 1:
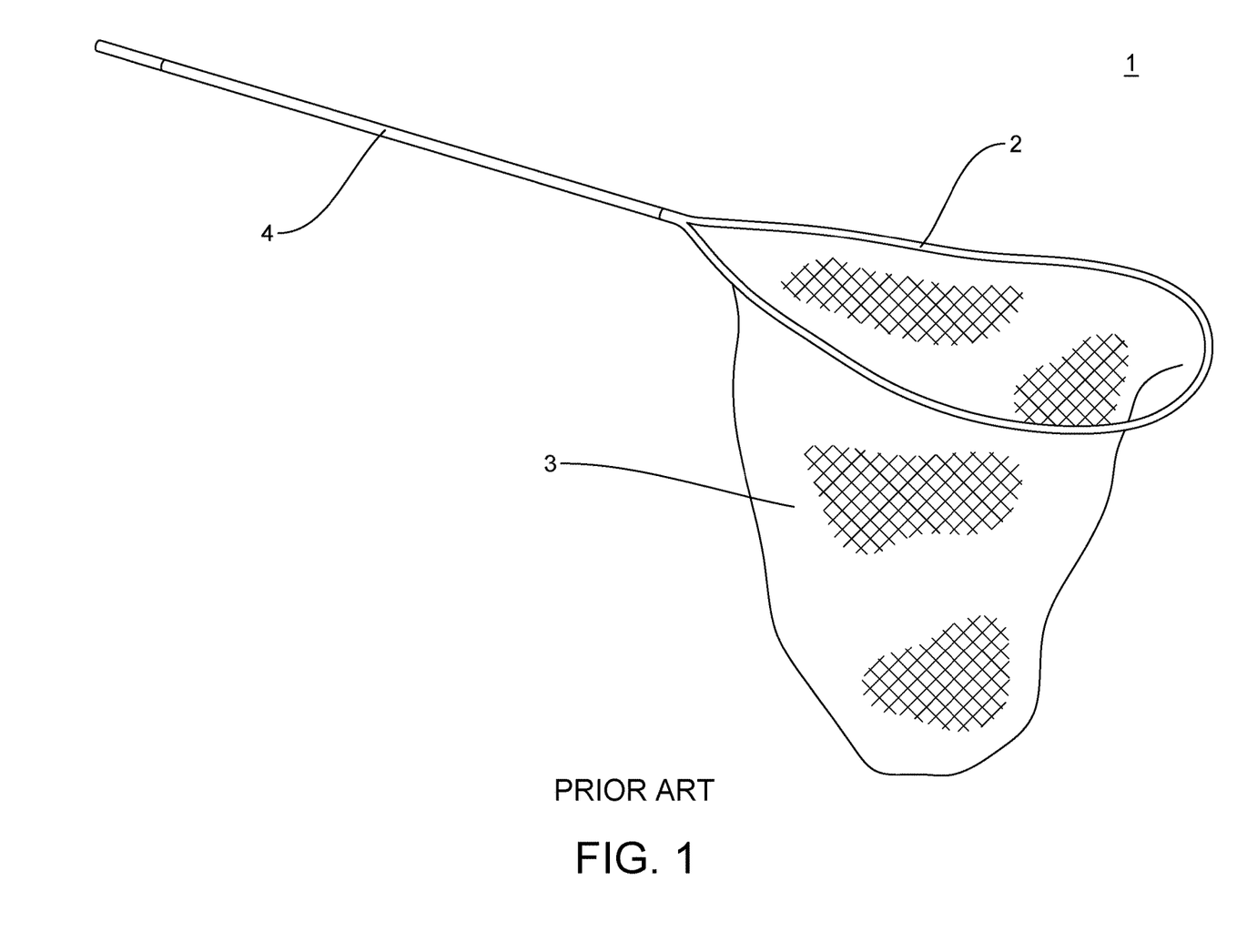
FIG. 1 shows an example of a known hand net.

FIG. 1 shows an example of a known hand net 1. The hand net 1 has a hoop 2 that is attached to a net 3 and a pole 4. State of the art hand nets, including hand net 1, suffer from a number of disadvantages such as lack of adjustability, cumbersome size, and poor ergonomics that make it difficult or uncomfortable for users to handle. Such hand nets require significant storage space and can be unwieldy to transport. An unfulfilled need exists for a hand net device and a handle assembly that overcome the aforenoted disadvantages.

SUMMARY OF THE DISCLOSURE

According to the principles of the disclosure, a hand net device is disclosed that comprises a basket that receives and holds an object, a yoke having a yoke body coupled to the basket, and a handle assembly having a proximal end and a distal end, the proximal end being adjustably coupled to the yoke body, wherein the yoke body guides the handle assembly between a stow position and an extended position. The hand net device can comprise an actuator assembly that releasably secures a portion of the handle assembly to the yoke body. The actuator assembly can secure the portion of the handle assembly in a channel located in the yoke body. The actuator assembly can comprise a handle lock that secures the portion of the handle assembly to the yoke body. The actuator assembly can comprise a lock actuator that moves the handle lock between a locked position and an unlocked position. The actuator assembly can comprise a fulcrum that attaches the handle lock to the yoke body. The fulcrum can allow the handle lock to pivot between an engagement position and a disengagement position. The actuator assembly can comprise a constant force spring that applies an engagement force to the handle lock. The handle assembly can include a recess that receives and engages with a male portion of the handle lock to fixedly secure the handle assembly to the yoke body.

The yoke can comprise a hinge that guides the proximal end of the handle assembly between the stow position and the extended position. The hinge can guide the proximal end of the handle assembly as the handle assembly pivots about an axis of the hinge. The yoke can comprise a bear-claw grip that releases the handle assembly to pivot with respect to the yoke body.

The yoke can comprise a yoke grip, which can be adjustable with respect to yoke body.

The yoke body can comprise a channel that holds and guides the proximal end of the handle assembly between the stow position and the extended position. The channel can be configured to guide the proximal end of the handle assembly longitudinally as the handle assembly slides along the channel. A length of the channel can be substantially equal to a length of the yoke body. The yoke body can comprise an opening formed in the channel to receive the proximal end of the handle assembly. The yoke body can comprise an opening at both ends of the channel to permit the proximal end of the handle assembly to enter one of the openings and exit from the other opening and move toward a distal end of the basket into the stow position.

The handle assembly can comprise a handle and an extension handle that is retractably housed within the handle. The handle assembly can comprise an extension actuator assembly that controls movement of the extension handle with respect to the handle. The extension actuator assembly can comprise a snap button assembly that secures a portion of the extension handle to the handle. The handle assembly can comprise a spring assembly that applies a force to one of the extension handle the said handle to move the extension handle when the extension actuator allows movement.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

The present disclosure is further described in the detailed description and drawings that follows.

DETAILED DESCRIPTION OF THE DISCLOSURE

The embodiments of the disclosure and the various features and advantageous details thereof are explained more fully with reference to the non-limiting embodiments and examples that are described or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

Figure 2:
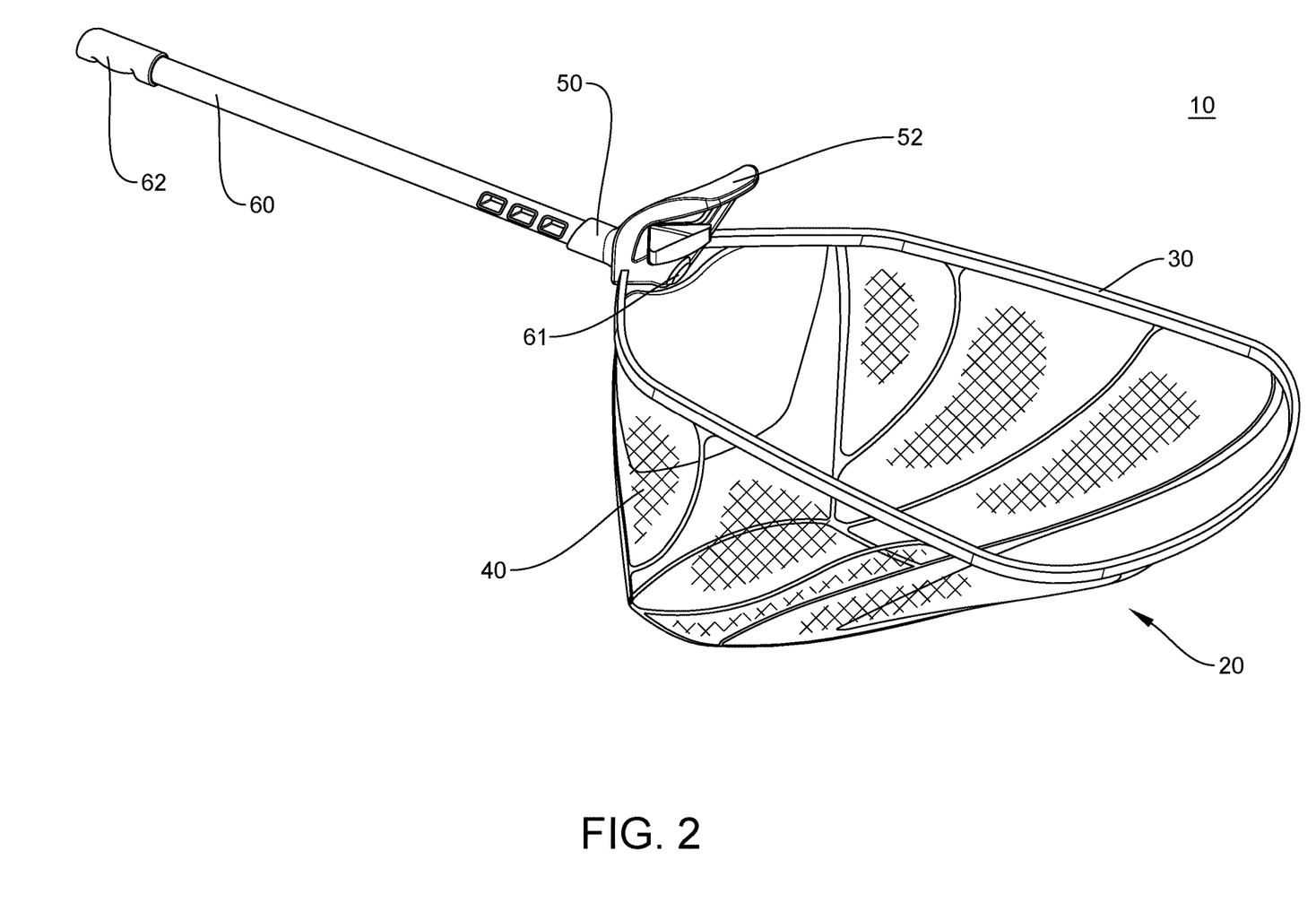
FIG. 2 shows a perspective view of an embodiment of a hand net device that includes an embodiment of a handle assembly, both of which are constructed according to the principles of the disclosure.

FIG. 2 shows an embodiment of a hand net device 10 constructed according to the principles of the disclosure. The hand net device 10 includes a basket 20, a yoke 50 and a handle assembly 60. The basket 20 can be attached to the yoke 50, which in turn can be coupled to the handle assembly 60. The yoke 50 can be adjustably or fixedly attached to the handle assembly 60. The basket 20 includes a hoop 30 and a net 40. The net 40 can be attached to the hoop 30. The hoop 30 can be connected to the yoke 50. It is noted that the basket 20 and yoke 50 can be formed as a single piece or assembled from multiple pieces.

The handle assembly 60 has a proximal end 61 and a distal end 62. The proximal end 61 can be movably coupled to the yoke 50. A grip can be attached to or formed with the distal end 62. The yoke 50 can include a yoke grip 52, which can be attached to or formed with the body of the yoke 50.

Figure 13:
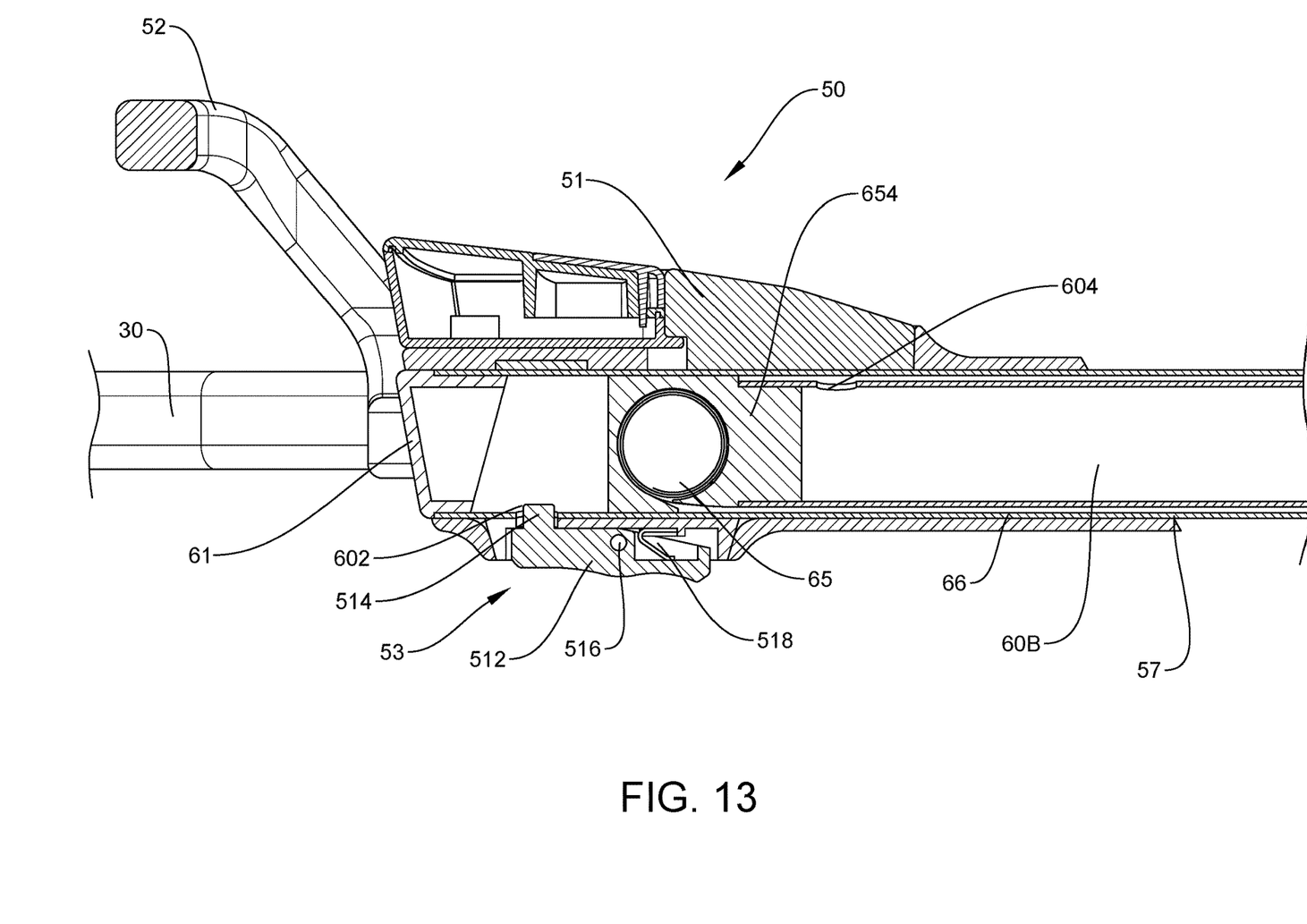
FIG. 13 shows another side cross-cut partial view of the handle assembly in FIG. 6 in the collapsed position, shown together with a cross-cut partial view of a yoke in the hand net device of FIG. 2.

The yoke grip 52 can be adjustable, such as, for example, being movable up or down with respect to the basket 20 or a portion of the yoke 50 such as, for example, a yoke body (for example, shown in FIG. 13).

Figure 3:
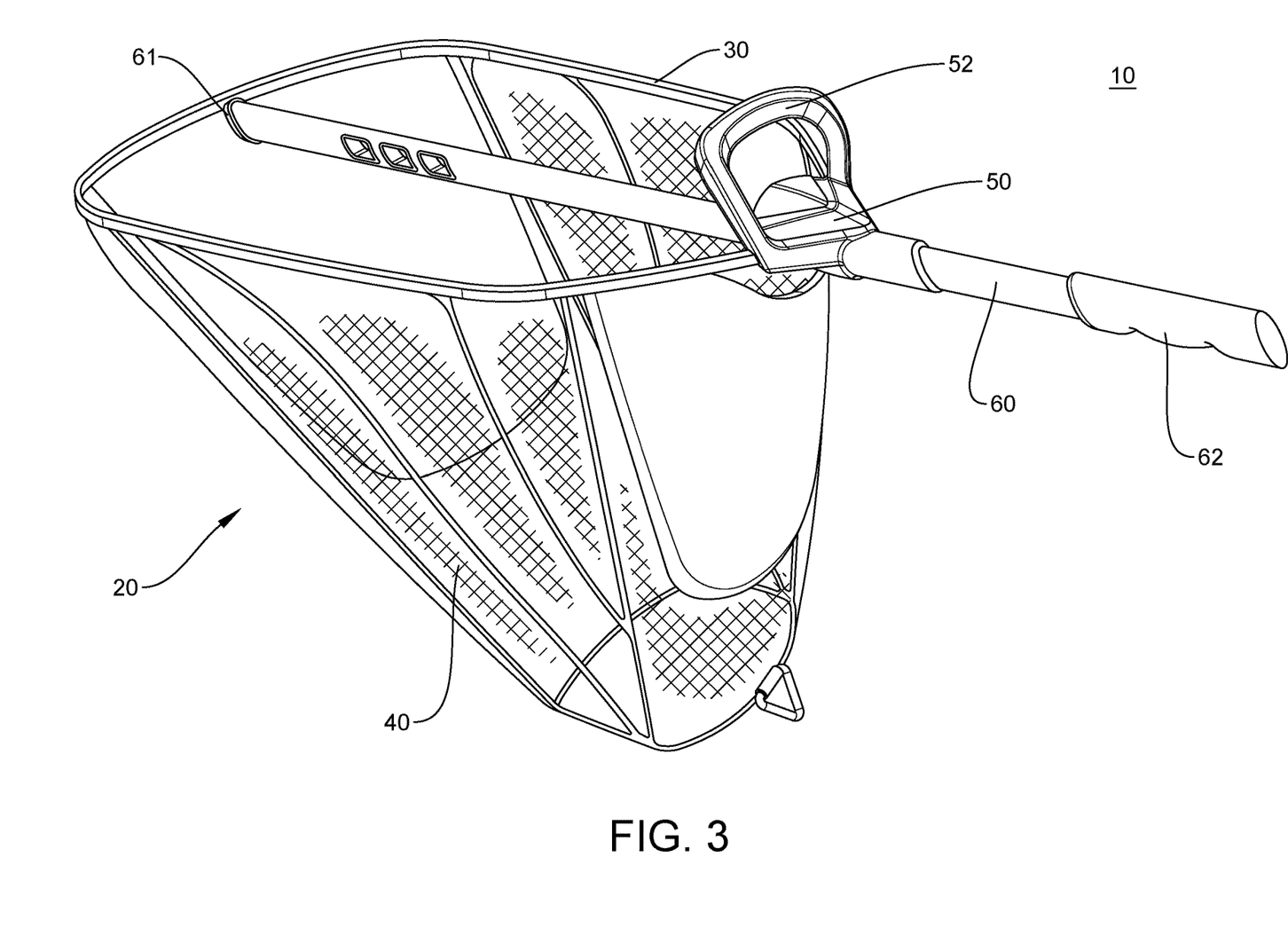
FIG. 3 shows the hand net device of FIG. 2 with the handle assembly located in a stow position.
Figure 4:
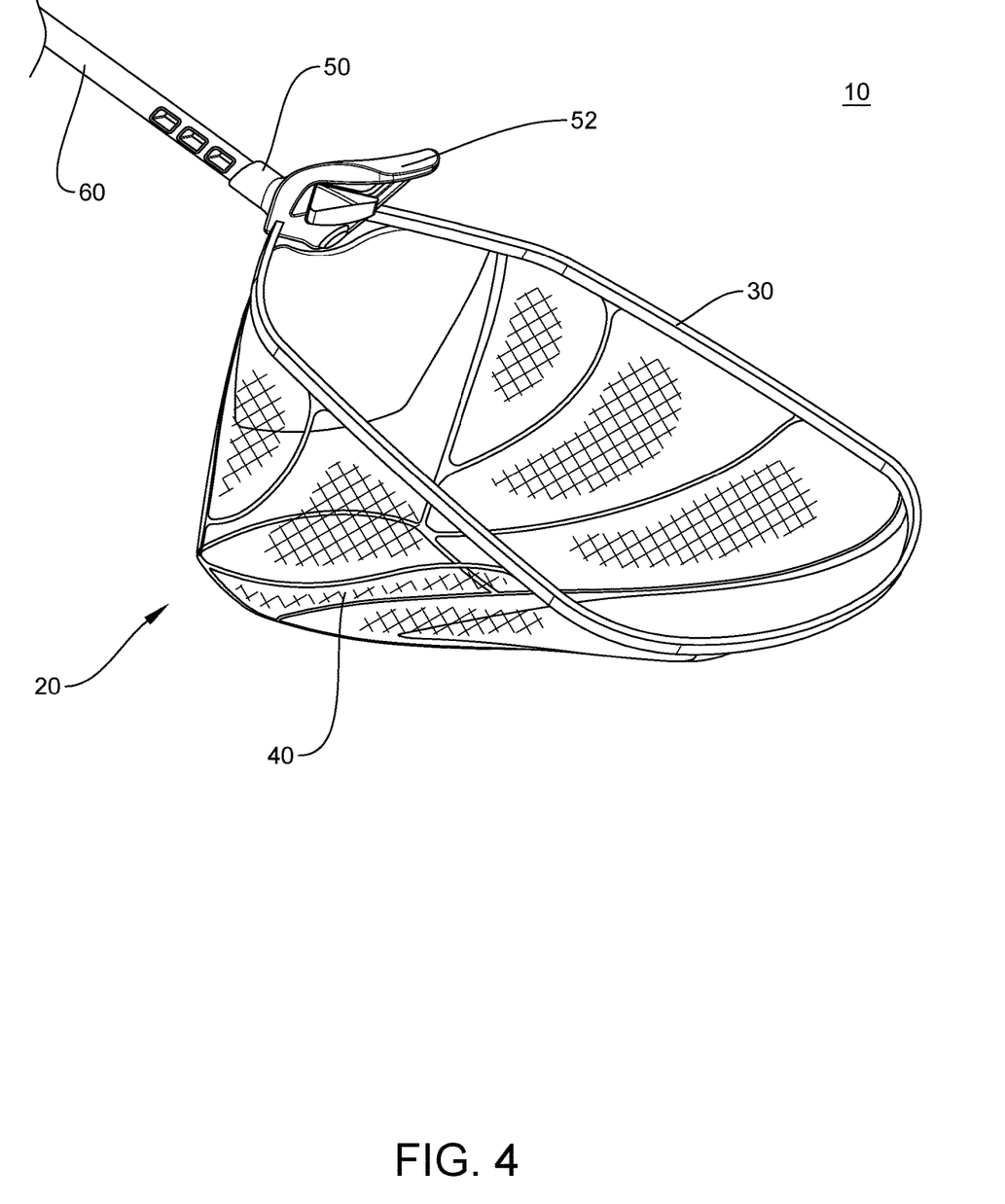
FIG. 4 shows the hand net device of FIG. 2 with the handle assembly located in an extended position.
Figure 5:
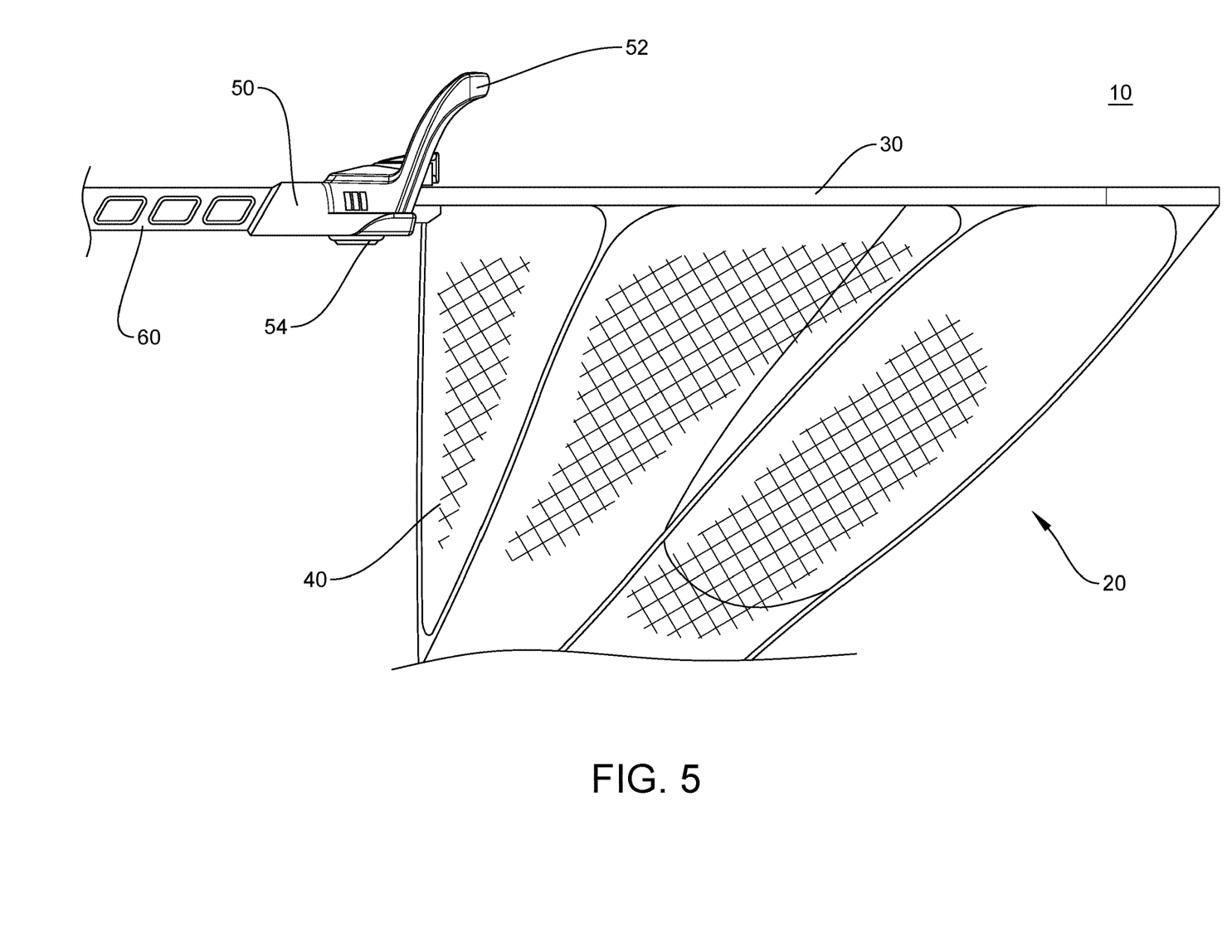
FIG. 5 shows a side view of the hand net device of FIG. 2 with the handle assembly located in the extended position.

FIGS. 3 and 4 show the hand net device 10 with the handle assembly 60 located in a stow position and an extended position, respectively. FIG. 5 shows a side view of the hand net device 10 with the handle assembly 60 located in the extended position.

Referring to FIGS. 2 and 3, the yoke 50 can guide the handle assembly 60, and the handle assembly 60 can move from the extended position shown in FIG. 2 to the stow position shown in FIG. 3. Additionally, the handle assembly 60 can move from the stow position in FIG. 3 to the extended position in FIG. 2. The handle assembly 60 can be positioned at any location between the stow and extended positions.

FIG. 13 shows a side cross-cut partial view of an embodiment of the yoke 50. The yoke 50 has a yoke body 51 that can include a channel 57 to receive, guide and hold the proximal end 61 of the handle assembly 60. The channel 57 includes an opening to receive the proximal end 61. The channel 57 can run lengthwise in the yoke body 51 and guide the handle assembly 60 as it travels through the channel 57. The yoke body 51 can include an opening at both ends of the channel 57, thereby permitting the proximal end 61 of the handle assembly 60 to enter the channel 57 at one end and travel the length of the channel 57, at which point the proximal end 61 can exit the channel 57 and move toward hoop 30, for example, in a direction that is perpendicular to a portion of the hoop 30. This design permits the proximal end 61 of the handle assembly 60 to be inserted in and through the yoke body 51 toward the end portion of the basket 20, thereby providing a compact design that requires less storage space and provides for easier transport. This design can also permit the user to slide the proximal end 61 of the handle assembly 60 up to the end of the basket 20, thereby securing large objects (such as, for example, fish) in the basket 20 and, possibly, reducing a likelihood that the objects fall or jump out of the basket 20 while walking or otherwise carrying the net device 10.

The yoke device 50 can include an actuator assembly 53, such as, for example, a snap button assembly, that secures a portion of the handle assembly 60 in the channel 57. The actuator assembly 53 can include a lock actuator 512 and a handle lock 514. As seen in FIG. 13, the lock actuator 512 and handle lock 514 can be formed as a single member and attached to the yoke body 51 by means of a fulcrum 516. The lock actuator 512 and handle lock 514 can pivot about the fulcrum 516 between an engagement position (shown in FIG. 13) and a disengagement position (not shown), whereby the handle lock 514 is retracted completely from the channel 57. In the engagement position (shown in FIG. 13), a male portion of the handle lock 514 can engage one or more recesses (or openings) 602 (also shown in FIG. 12) to securely lock the handle assembly 60 in the channel 57 in, for example, the collapsed position. The actuator assembly 53 can include a spring mechanism 518, such as, for example, a spring, memory steel, memory plastic, or any other suitable device that can store energy and release the energy to exert a force. The spring mechanism 518 can force the lock actuator 512 and handle lock 514 into the engagement position until sufficient force is applied to a portion of the lock actuator 512 to force the lock actuator 512 to compress the spring mechanism 518 and to pivot about the fulcrum 516 to retract the handle lock 514 from the channel 57.

The handle assembly 60 can include one or more recesses (or openings) 602 (or 604A, 604B) that can receive and engage with a male portion of the handle lock 644, thereby providing fixed securement of the handle assembly 60 with respect to the yoke body 51. The handle assembly 60 can include multiple recesses 602 along its length, thereby providing multiple locations at which the handle assembly 60 can be securely held in place with respect to the yoke body 51.

A user can slide and adjust the position of the handle assembly 60 with respect to the yoke body 51 by applying a force to the lock actuator 512 using one hand, while simultaneously pulling or pushing the handle assembly 60 from or into the yoke body 51. The user can remove the applied force to release the lock actuator 512, thereby permitting the lock actuator 512 to snap into the recess 602 (under force of the spring 518) when the male portion of the lock actuator 512 aligns with the recess 602, such as, for example, when the handle assembly 60 is pushed in or pulled from the yoke body 51.

Figure 6:
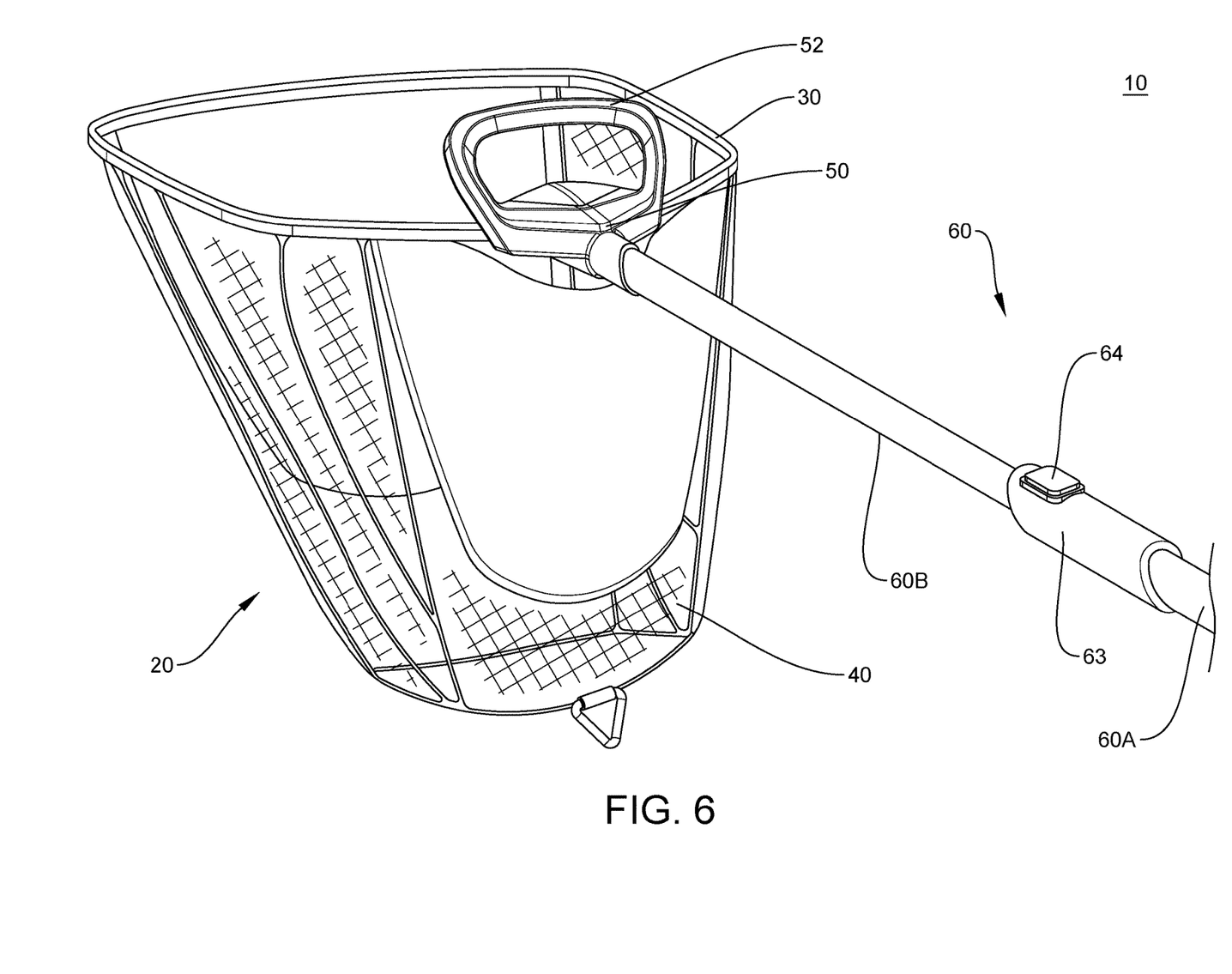
FIG. 6 shows another embodiment of a handle assembly included in the hand net device of FIG. 2.

FIG. 6 shows another embodiment of a handle assembly 60, which can be included in the hand net device 10, according to the principles of the disclosure. As seen in FIG. 6, the handle assembly 60 can include an outer handle 60B, an inner extension handle 60A, an extender 63, and an extension actuator assembly 64. It is noted that the handle assembly 60 can include one or more further extension handles (not shown), extenders (not shown), and extension actuator assemblies (not shown). The extension handle 60A can be retractably or telescopically housed in the outer handle 60B (e.g., as seen in FIGS. 8-13) such that a portion or substantially the entire length of the extension handle 60A can be housed in the outer handle 60B, such as when the handle assembly 60 is in a collapsed position (for example, shown in FIG. 8). The extension handle 60A can slide out of the outer handle 60B, thereby moving from the collapsed position to the extended position (for example, as seen in FIG. 10). The extender 63 and extension actuator assembly 64 can be configured to allow the extension handle 60A to be positioned at any one or more points between the collapsed position and extended position.

Figure 7:
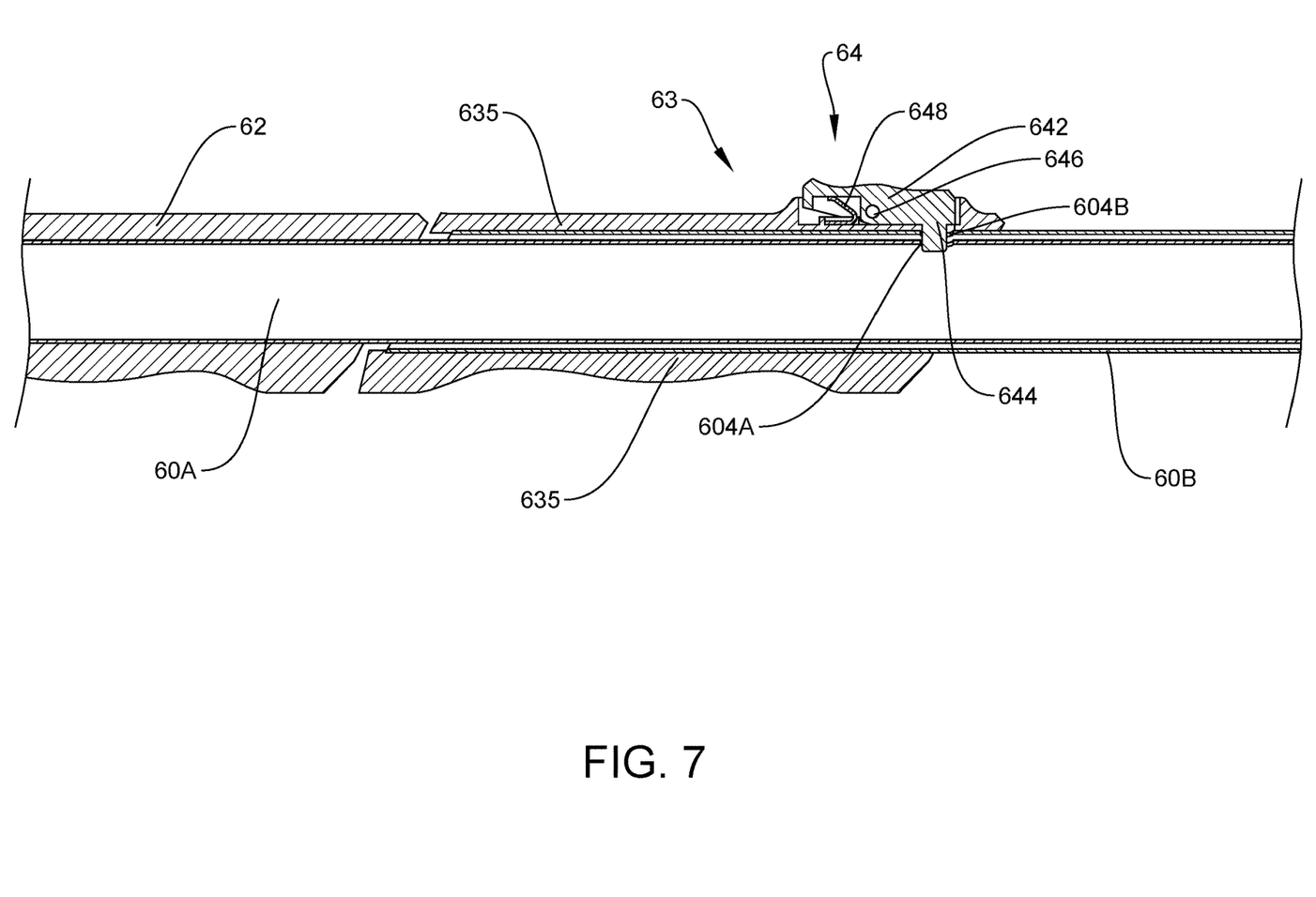
FIG. 7 shows a side cross-cut partial view of the handle assembly in FIG. 6 in a collapsed position.

FIG. 7 shows a side cross-cut partial view of the handle assembly 60, including the grip 62, inner extension handle 60A, outer handle 60B, extender 63, and extension actuator assembly 64. As seen, the extender 63 can include the extension actuator assembly 64. The extender 63 can include a handle chamber 635 that fixedly holds an end portion of the outer handle 60B. Alternatively, the extender 63 can be releasably secured to the handle 60B, such that the handle 60B can be moved within or with respect to the extender 63. The end portion of the outer handle 60B can be inserted into the handle chamber 635, or the extender 63 can be formed with the end portion of the outer handle 60B. The chamber 635 can have a cylindrical shape with an inner diameter that is substantially equal to an outer diameter of the end portion of the outer handle 60B, so as to provide a snug and secure fit. The outer handle 60B can include an opening 604B that permits a male portion of an extension lock 644 to pass through the opening 604B and engage an opening 604A in the inner extension handle 60A residing within the outer handle 60B and located under the opening 604B. The outer handle 60B can include one or more openings 604B and one or more openings 602 (for example, shown in FIGS. 12 and 13). The extension handle 60A can include one or more openings 604A.

An opening 602 in the outer handle 60B can be engaged by the yoke 50 to lock the outer handle 60B in the yoke 50 in the operational configuration (as seen in FIGS. 5 and 13). The outer handle 60B can include another opening 602 to lock the outer handle 60B in the yoke 50 in the stow position (as seen in FIG. 3).

Figure 9:
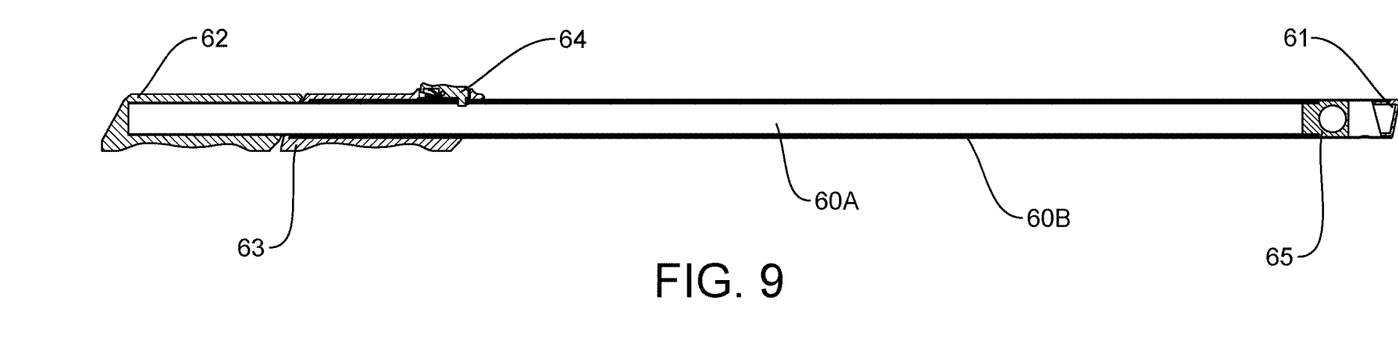
FIG. 9 shows a side cross-cut view of handle assembly in FIG. 6, shown in the collapsed position.
Figure 10:
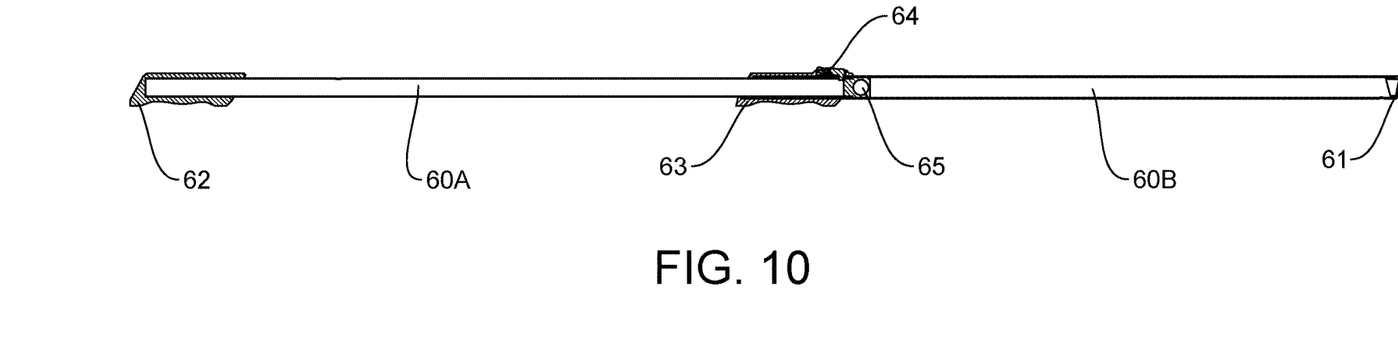
FIG. 10 shows a side cross-cut view of the handle assembly in FIG. 6, shown in an extended position.
Figure 11:
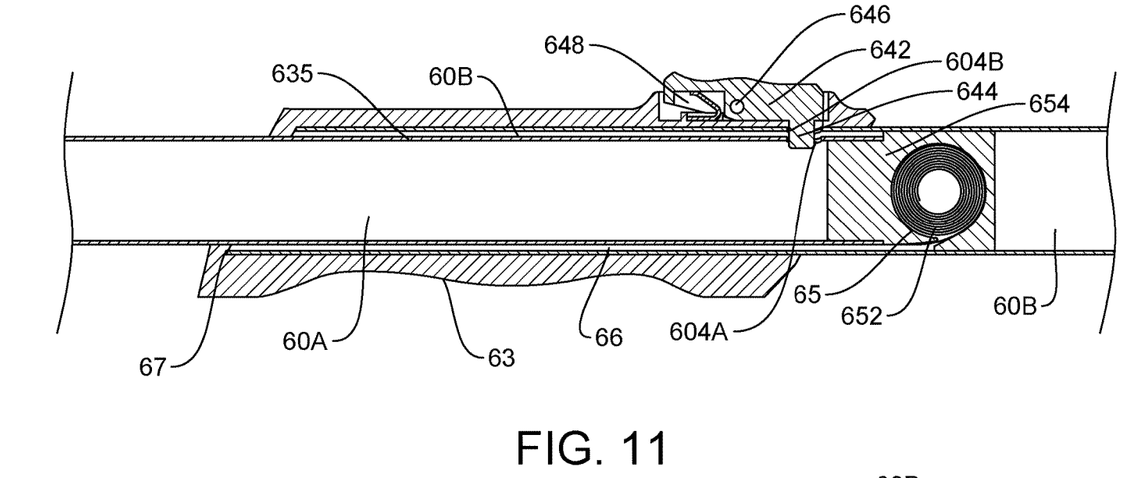
FIG. 11 shows a side cross-cut partial view of the handle assembly in FIG. 6, shown in the extended position.

An opening 604B in the outer handle 60B and an opening 604A in the extension handle 60A can be simultaneously engaged by the extension actuator assembly 64 to secure the handle assembly 60, including the extension handle 60A, in the extended position (shown in FIGS. 10 and 11). The same (or another) opening 604B in the outer handle 60B and another opening 604A in the extension handle 60A can be simultaneously engaged by the extension actuator assembly 64 to securely engage and lock both the extension handle 60A and outer handle 60B in the collapsed position (shown in FIGS. 9 and 12).

The extension actuator assembly 64 can include, for example, a snap button assembly to secure a portion of the extension handle 60A in the outer handle 60B or the extender 63. The extension actuator assembly 64 can include a lock actuator 642 and an extension lock 644. The lock actuator 642 and extension lock 644 can be formed as a single member and attached to the extender 63 by means of a fulcrum 646. The lock actuator 642 and extension lock 644 can pivot about the fulcrum 646 between an engagement position (shown in FIG. 7) and a disengagement position (not shown), whereby the extension lock 644 can be retracted completely from the inner chamber of the outer handle 60B that houses the extension handle 60A. The extension actuator assembly 64 can include a spring mechanism 648 that forces the lock actuator 642 and extension lock 644 into the engagement position and keeps it in that position until sufficient force is applied to a portion of the lock actuator 642 to force the lock actuator 642 to compress the spring mechanism 648 and to pivot about the fulcrum 646 to retract the extension lock 644 from the extension handle 60A. The spring mechanism 648 can be the same as or different from the spring mechanism 518.

Figure 8:
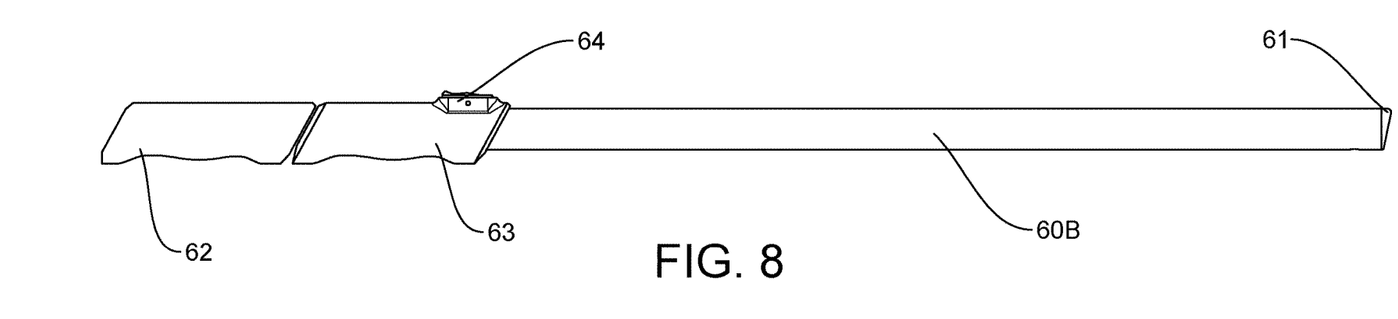
FIG. 8 shows a side view of the handle assembly in FIG. 6, shown in a collapsed position.
Figure 12:
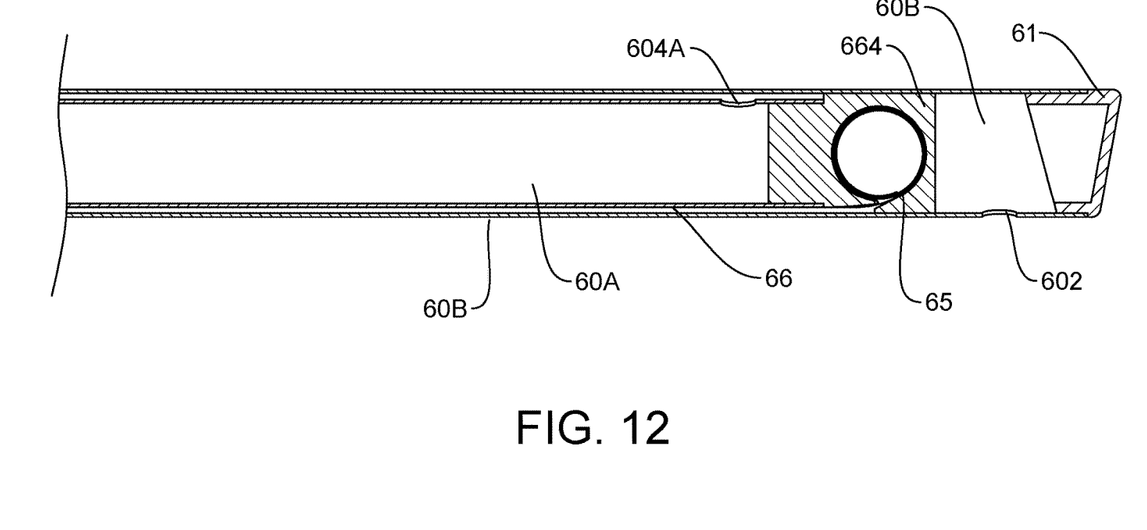
FIG. 12 shows a side cross-cut partial view of the handle assembly in FIG. 6, shown in the collapsed position.

FIGS. 8-12 show various views of the handle assembly 60. FIG. 8 shows a side view of the handle assembly 60 in a collapsed configuration. FIG. 9 shows a side cross-cut view of the handle assembly 60 in the collapsed configuration. FIG. 10 shows a side cross-cut view of the handle assembly 60 in an extended position (or configuration). FIG. 11 shows a side cross-cut partial view of the handle assembly 60 in the extended configuration. FIG. 12 shows a side cross-cut partial view of the handle assembly 60 in the collapsed configuration.

Referring to FIGS. 9-12, the handle assembly 60 can include a spring assembly 65. The spring assembly 65 can include, for example, a constant rate spring 652 that can have one end 67 attached to the extender 63 (or outer handle 60B) and the other end can be coupled to a handle plug body 654 that includes a chamber that holds the spring 652 as it winds up as shown, for example, in FIG. 11, or winds out as shown, for example, in FIG. 12. A portion 66 of the spring 652 can be fixedly secured to the extender 63 (or outer handle 60B) together with the end 67. As the extension handle 60A is collapsed (or inserted) into the outer handle 60B, the handle assembly 60 is collapsed and the spring 652 unwinds from the wound-state (shown in FIG. 11) to the unwound-state (shown in FIG. 12), thereby stretching along substantially the entire length of the inner handle 60A. In this example, the spring assembly 65 is configured to exert an outward force on the inner extension handle 60A with respect to the outer handle 60B. It is noted that the direction of force can be reversed, so that the spring assembly 65 exerts an inward force on the inner extension handle 60A with respect to the outer handle 60B.

As seen in FIGS. 6-13, the handle assembly 60 can provide multi-stage (for example, two-stage) handle extension. The first stage can include permitting the handle assembly 60 to move through and out of the yoke body 51 until, for example, the handle lock 514 or, for example, a snap button (shown in FIG. 13) snaps into the opening 602 (shown in FIGS. 12 and 13) of the outer handle 60B. The second stage can include extending the extension handle 60A by operating the extension actuator 64 or pushing down on the snap button to release the inner extension handle 60A to slide out of the outer handle 60B until the extension actuator 64 or snap button hits the fully extended position (shown in FIGS. 10 and 11) and locks into place. In the fully extended position the spring 652 can be wound up substantially completely in the spring chamber of the handle plug body 654. As the extension handle 60A moves into the outer handle 60B, the spring 652 is forced to unwind and stretch along substantially the entire length of the inner handle 60A. The direction of force exerted on the inner extension handle 60A with respect to the outer handle 60B can be reversed by attaching the handle plug body 654 to either of the handles 60A, 60B and attaching the end 67 of the spring 652 to the other of the handles 60B, 60A, respectively (or extender 63, as appropriate), as will be understood by those skilled in the art.

Figure 14:
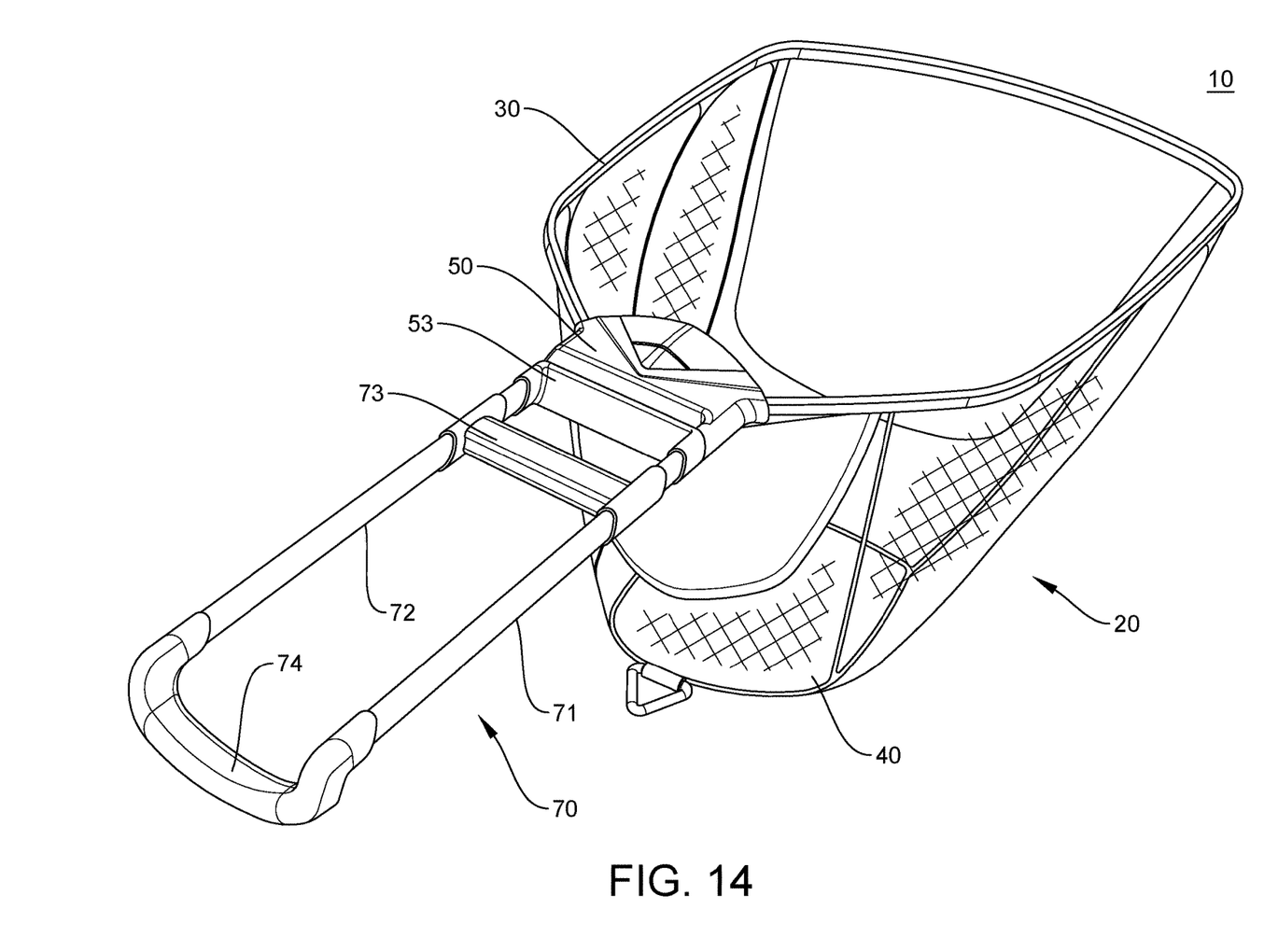
FIG. 14 shows a perspective view of another embodiment of a hand net device that includes another embodiment of a handle assembly, both of which are constructed according to the principles of the disclosure.
Figure 15:
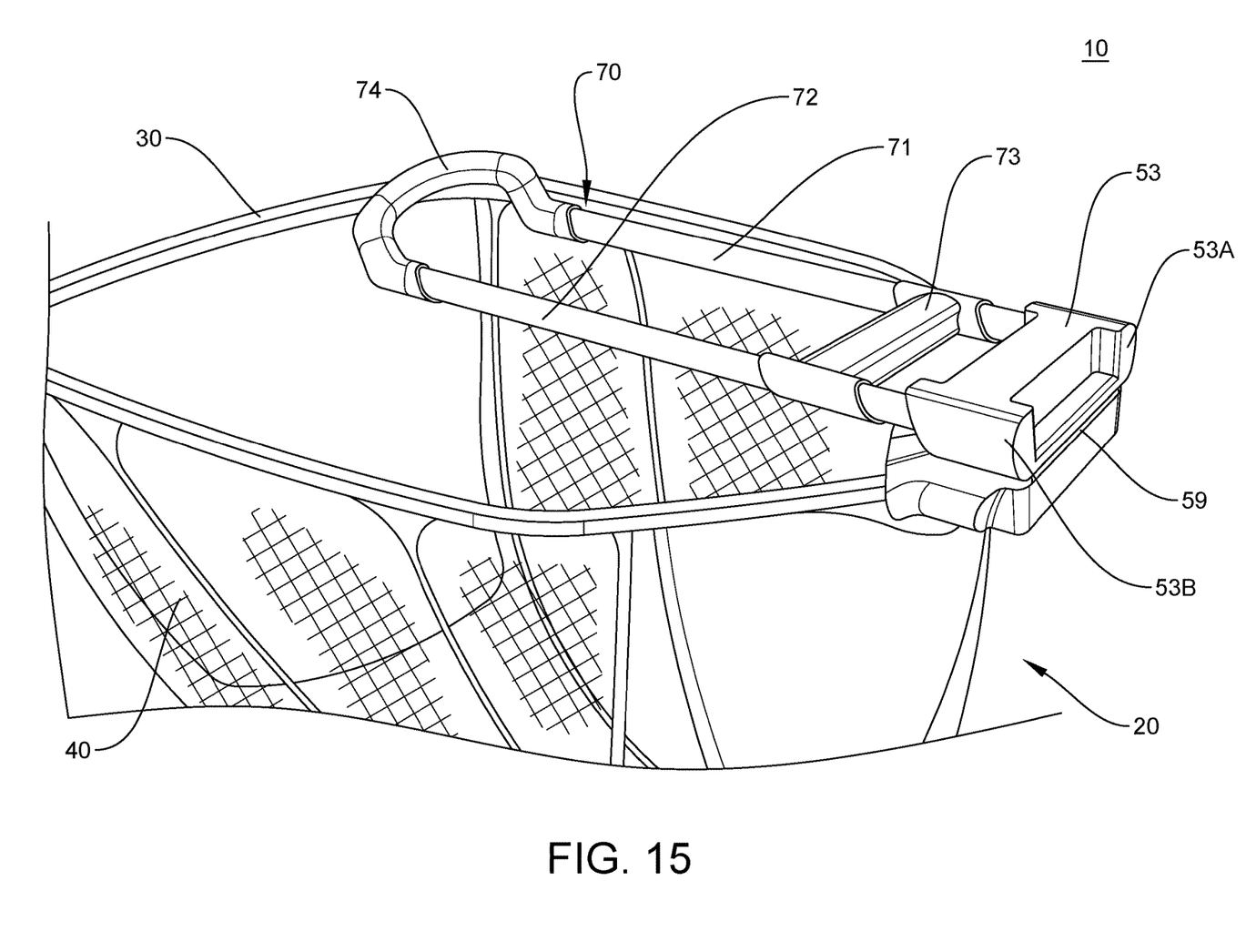
FIG. 15 shows the hand net device of FIG. 14 with the handle assembly located in a stow position.

FIGS. 14 and 15 show perspective views of another embodiment of a hand net device 10 that includes another embodiment of a handle assembly 70. FIG. 14 shows the hand net device 10 with the hand assembly 70 in an extended position. FIG. 15 shows the hand net device 10 with the hand assembly 70 in a stow position. The yoke 50 can include a hinge 59 (shown in FIG. 15). The yoke 50 can include a bear-claw release 53. The bear-claw release 53 can include pair of yoke locks 53A, 53B, such as, for example, a pair of ball detents or any other device or combination of devices that can provide a resistive force that is sufficient to keep the hand assembly 70 in the extended position during operation, but low enough that a user can easily overcome the resistive force by, for example, grasping an arm rest 74 with one hand and, for example, the hoop 30 with the other hand and pivoting the arm rest 74 toward the hoop 30 to fold the handle assembly 70 into the stow position. The resistive force can be, for example, less than 10 pounds per square inch (PSI), or it can be greater than 10 PSI. A device (not shown) can be included that provides a resistive force that is sufficient to keep the hand assembly 70 in the stow or folded position until an unfolding force is applied that is sufficient enough to overcome the resistive force of the device (not shown). An example of such a device is, for example, a spring mechanism (not shown) provided in or with the hinge 59 that biases the hinge 59 to an open (or unfolded) position. The pair of yoke locks 53A, 53B can engage and lock the handle assembly 70 to the yoke 50, thereby securing the handle assembly in the extended position shown in FIG. 14. The yoke locks 53A, 53B can be released by folding the handle assembly 70 with respect to the yoke 50 or hoop 30.

The handle assembly 70 includes a pair of handles 71, 72, a grip 73 and the arm rest 74. The grip 73 can be adjustable and capable of sliding along the lengths of handles 71, 72, to allow for adjustment of the grip 73 relative to the arm rest 74 to different arm lengths. In a non-limiting embodiment of the disclosure, the handle assembly 70 can be fold with respect to the yoke 50, as shown in FIG. 15. In another non-limiting embodiment, the handle assembly 70 can be configured so that the handles 71, 72 can slide in and through the yoke 50, for example, similar to the handle assembly 60 shown in FIG. 3. In a further non-limiting embodiment of the disclosure, the handle assembly 70 can be configured so that the handles 71, 72 can slide in and through the yoke 50 (for example, similar to the handle assembly 60 shown in FIG. 3) and the yoke 50 can include the hinge 59, which can allow the handle assembly 70 to fold with respect to the hoop 30 when the handles 71, 72 are fully retracted from the yoke 50. The net device 10 with the handle assembly 70 can be ideal for use by, for example, kayak anglers, since it provides for one-handed operation or landing. Moreover, the net device 10 has a folding yoke design for compact storage (shown in FIG. 15).

Each of the handles 71 and 72 can include the extendable multi-handle design of the handle assembly 60 shown in FIG. 6, wherein the grip 73 can include a single or a pair of extension actuator assemblies 64, as will be understood by those skilled in the art. Each of the handles 71 and 72 can include one or more telescopically retractable or extractable members (not shown) to adjust the overall length of the handle assembly 70 to accommodate users with different arm lengths or to facilitate a longer reach such as, for example, might be necessary where the hand net device 10 is used off the side of a deep-hull boat to scoop up a fish caught using, for example, a rod and reel.

Figure 16A:
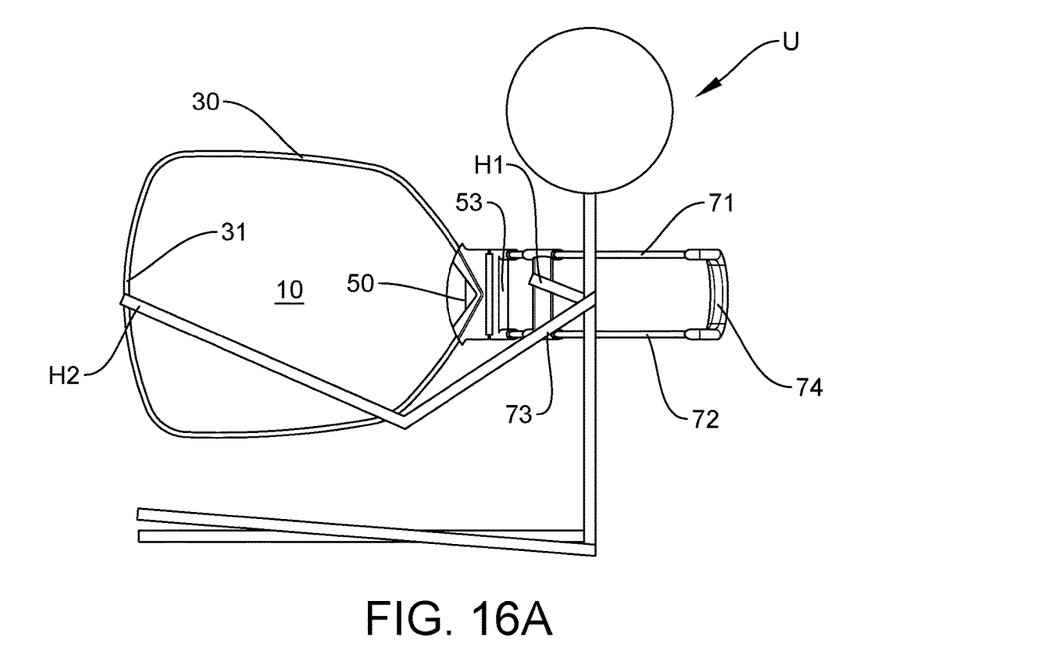
FIGS. 16A-16C show various views of a process for collapsing (or extending) the handle assembly in the hand net device of FIG. 14.
Figure 16B:
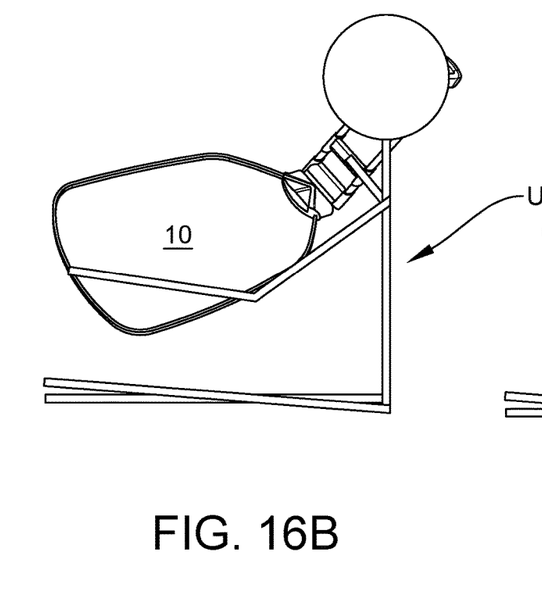
Figure 16C:
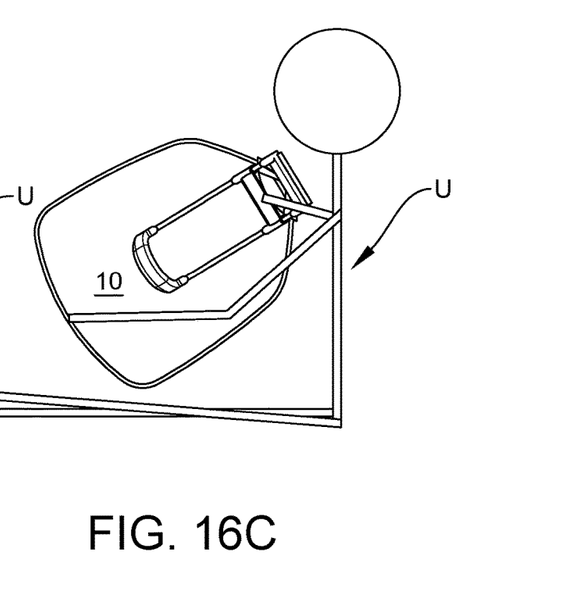

FIGS. 16A-16C show various views of a process for collapsing (or extending) the handle assembly 70 in the hand net device 10. Initially, as seen in FIG. 16A, a user U can release the yoke locks 53A, 53B by, for example, gripping the handle 73 with one hand H1 and applying a force (such as a folding force), thereby releasing and permitting the handle assembly 70 to pivot with respect to the hinge 59. The user U can grasp a portion 31 of the hoop 30 with the other hand H2 and fold the handle assembly 70 (shown in FIG. 16B) from the extended position shown in FIG. 16A to the collapsed position shown in FIG. 16C.

The terms "a," "an," and "the," as used in this disclosure, means "one or more," unless expressly specified otherwise.

The terms "including," "comprising," and variations thereof, as used in this disclosure, mean "including, but not limited to," unless expressly specified otherwise.

Although process steps, method steps, or the like, may be described in a sequential order, such processes and methods can be configured to work in alternate orders. In other words, any sequence or order of steps that may be described does not necessarily indicate a requirement that the steps be performed in that order. The steps of the processes or methods described herein can be performed in any order practical. Further, some steps can be performed simultaneously.

When a single structure or article is described herein, it will be readily apparent that more than one device or article may be used in place of a single device or article. Similarly, where more than one device or article is described herein, it will be readily apparent that a single structure or article may be used in place of the more than one structure or article. The functionality or the features of a structure or article may be alternatively embodied by one or more other structures or articles that are not explicitly described as having such functionality or feature.

While the disclosure has been described in terms of exemplary embodiments, those skilled in the art will recognize that the disclosure can be practiced with modifications in the spirit and scope of the instant disclosure. These examples given above are merely illustrative and are not meant to be an exhaustive list of all possible designs, embodiments, applications or modifications of the disclosure.

What is claimed is:

1. A hand net device, comprising:
   a basket that receives and holds an object;
   a yoke having a yoke body coupled to the basket; and
   a handle assembly having a proximal end and a distal end, the proximal end being adjustably coupled to the yoke body;
   an actuator assembly that releasably secures a portion of the handle assembly to the yoke body, wherein the actuator assembly comprises:
      a handle lock that secures said portion of the handle assembly to the yoke body;
      a lock actuator that moves the handle lock between a locked position and an unlocked position; and
      a fulcrum that attaches the handle lock and lock actuator to the yoke body; and
   a constant force spring attached to the handle assembly that applies an engagement force to the handle assembly,
   wherein the yoke body guides the handle assembly between a stow position and an extended position,
   wherein when the handle assembly transitions from the stow position to the extended position, the constant force spring winds upon itself to form a coil, and
   wherein when the handle assembly transitions from the extended position to the stow position, the constant force spring unwinds from the coil.

2. The hand net device of claim 1, wherein the yoke comprises a yoke grip.

3. The hand net device of claim 2, wherein the yoke grip is adjustable with respect to the yoke body.

4. The hand net device of claim 1, wherein the yoke body comprises a channel that holds and guides the proximal end of the handle assembly between the stow position and the extended position.

5. The hand net device of claim 4, wherein the channel guides the proximal end of the handle assembly longitudinally as the handle assembly slides along the channel.

6. The hand net device of claim 4, wherein a length of the channel is substantially equal to a length of the yoke body.

7. The hand net device of claim 4, wherein the yoke body comprises:
   an opening formed in the channel to receive the proximal end of the handle assembly.

8. The hand net device of claim 4, wherein the yoke body comprises:
   an opening at each end of the channel to permit the proximal end of the handle assembly to enter at one of the openings and exit from another of the openings and move toward a distal end of the basket into the stow position.

9. The hand net device of claim 1, wherein the actuator assembly releasably secures said portion of the handle assembly in a channel located in the yoke body.

10. The hand net device of claim 1, wherein the fulcrum allows the handle lock to pivot between an engagement position and a disengagement position.

11. The hand net device of claim 1, wherein the handle assembly includes a recess that receives and engages with a male portion of the handle lock to fixedly secure the handle assembly to the yoke body.

12. The hand net device of claim 1, wherein the handle assembly comprises:
   a handle; and
   an extension handle that is retractably housed within said handle.

* * * * *